United States Patent [19]
Gryder

[11] Patent Number: 5,252,068
[45] Date of Patent: Oct. 12, 1993

[54] WEIGHT-SHIFT FLIGHT CONTROL TRANSDUCER AND COMPUTER CONTROLLED FLIGHT SIMULATOR, HANG GLIDERS AND ULTRALIGHT AIRCRAFT UTILIZING THE SAME

[75] Inventor: Bradley H. Gryder, Hiddenite, N.C.

[73] Assignee: Flight Dynamics, Incorporated, Raleigh, N.C.

[21] Appl. No.: 816,650

[22] Filed: Dec. 31, 1991

[51] Int. Cl.$^5$ .................... B64C 31/02; G09B 09/08
[52] U.S. Cl. ........................... 434/30; 244/16; 244/900; 244/222; 244/236; 244/904
[58] Field of Search ............... 244/16, 900, 222, 228, 244/234, 236, 904; 273/148 B, DIG. 28; 434/30

[56] References Cited

U.S. PATENT DOCUMENTS

| | | | |
|---|---|---|---|
| 3,995,799 | 12/1976 | Bartolini | 244/900 X |
| 4,355,982 | 10/1982 | James | 434/30 |
| 4,817,950 | 4/1989 | Goo | 273/148 B |
| 5,076,584 | 12/1991 | Openiano | 273/148 B |

FOREIGN PATENT DOCUMENTS

| | | | |
|---|---|---|---|
| 3245719 | 6/1984 | Fed. Rep. of Germany | 244/16 |
| 3403346 | 9/1985 | Fed. Rep. of Germany | 244/16 |
| 2555128 | 5/1985 | France | 244/904 |
| 2608125 | 6/1988 | France | 244/16 |
| 2655016 | 5/1991 | France | 244/904 |
| 1308522 | 5/1987 | U.S.S.R. | 244/16 |

*Primary Examiner*—Gene Mancene
*Assistant Examiner*—L. Thomas
*Attorney, Agent, or Firm*—Richard S. Faust

[57] ABSTRACT

The weight-shift movements of a suspended pilot are transformed into electrical signals representative of the movements. The signals may be used as the pitch and roll input information in an interactive computerized flight simulation system. The signals may also be generated by an actual pilot of a hang glider or ultralight aircraft and used on board to control ailerons, elevators, rudders, or the like, so as to enhance the performance potentials of these types of aircraft.

19 Claims, 4 Drawing Sheets

WEIGHT-SHIFT FLIGHT CONTROL TRANSDUCER AND COMPUTER CONTROLLED FLIGHT SIMULATOR, HANG GLIDERS AND ULTRALIGHT AIRCRAFT UTILIZING THE SAME

FIELD OF INVENTION

This invention relates to flight controls, specifically to a device which transforms the weight shifting movements of a suspended pilot into electrical signals. The invention has application to flight simulators, to actual flight control for hang gliders and ultralight aircraft, and to entertainment systems based on the suspended pilot environment.

BACKGROUND OF THE INVENTION

Hang gliding has evolved over the years into a very competitive sport, with experienced pilots always searching for any new technologies, techniques, or equipment which will allow them to fly further and faster than other pilots. The personal experiences of hang gliding flight are so rewarding that pilots are always eager to train others to fly so as to share these experiences. There are so many different skills to master in order to become a good hang glider pilot that many students unfortunately give up before they can reach the point of being able to experience high altitude sustained soaring flights.

Effective training of new hang glider pilots has always been a problem. Crude simulators have been erected in the past in order to aid in the training of new students. Francis M. Rogallo developed one such device in 1981. Rogallo's device was a mechanical system in which a fan blew air in the student's face to simulate relative windspeed. Rogallo's model was used to aid students in understanding the effect of body position on airspeed, but the full effects of weight-shift combinations on pitch and roll were not simulated with this device.

Another hang glider flight simulator is disclosed in U.S. Pat. No. 4,335,982 to Christopher James. The James patent is a passive device, wherein the student is able to view a prerecorded flight scenery on a large projector screen while motors move A-frame handle bars and a pilot suspension system. The James patent has potential for showing a student how it might feel to ride as a passenger on a hang glider which is controlled by someone else, but the student has no control over the prerecorded flight, regardless of his attempts to provide input. If the student is not cautioned that he is actually providing no input into the simulated flight, he could falsely conclude that he has made successful flights in the simulator and he might think that he has learned how to control a hang glider.

The widely accepted and currently preferred method of aircraft flight simulation is to employ digital microprocessors or computers and accompanying software programming. There are several commercially available flight simulation software packages which can be run on personal computers. Microsoft's "Flight Simulator ®," version 4.0 includes a sailplane simulation. Microsoft's "Aircraft and Scenery Designer," version 1.0 can be used to modify the sailplane flight characteristics so that it accurately simulates hang glider performance. Different landscapes and environments can be created using the scenery design portion of the software, providing a means for creation of various flying sites and situations. There are several computer peripheral devices currently available which can be used to provide input for the computer based simulators. These peripheral devices include joysticks, yokes, throttle handles, and rudder pedals which rest on the floor. However, none of these input devices are acceptable interfaces for suspended pilots who use weight shift to control their aircraft, such as hang glider pilots do. Without this necessary interface, the hang gliding experience can not be adequately simulated, nor is there any opportunity for helpful training.

Turning now to actual aircraft flight control systems, it is well known that such systems have developed over the years which depart from the purely mechanical systems to include the use of electrical signals that control remote electromechanical devices. The advantages are numerous and well documented. One of the primary advantages of the electrical control system is the ease of signal conditioning and modulation in order to achieve the desired response due to the given input conditions. Computers and logic control systems can also be incorporated into the system and be programmed so as to greatly enhance the response, overall stability, and safety of the aircraft.

Although the advantages of electromechanical control systems are widely acknowledged and incorporated into the latest aircraft designs, the weight-shift type control system has never been augmented by electromechanical devices. Current hang glider performance is limited by the lack of control authority obtainable with the standard weight-shift control system, which requires that wing spans and aspect ratios be severely limited in comparison with sailplanes. Several innovative mechanical and structural augmentation devices have been successfully employed in some designs, but the practical limits of this approach have also been reached. The principle of this invention can be used to provide a means for incorporation of electromechanical control systems into hang gliders and ultralight aircraft, which should enhance performance potentials for these type aircraft.

SUMMARY OF THE INVENTION

The present invention provides a versatile system for transforming the weight-shift motions of a suspended pilot into signals representative of the movements. In one aspect, the invention is utilized in a suspended-pilot environment that includes a mechanical support structure for suspending a pilot with freedom of weight-shift movement and includes a weight-shift flight control transducer associated with the mechanical support structure for transforming the weight-shift movements of the suspended pilot into signals representative of the movements. This transducer may be used in an actual aircraft which includes moveable flight control surfaces and further includes means for moving the flight control surfaces in response to the signals generated by the transducer. The transducer may also be used in association with a computerized flight simulation system which includes a computer, flight simulation software and a video monitor positioned in view of the suspended pilot wherein the computerized flight simulation system is operable in response to the signals generated by the transducer.

In another aspect, the invention may be characterized as a method of tracking the weight-shift movements of a suspended pilot in an interactive computerized flight simulation system or an actual aircraft and generating signals representative of the pilot's weight-shift movements with the method including the steps of suspending a pilot from a mechanical support structure so as to provide the pilot with a freedom of weight-shift movements of the type used to control a hang glider, providing moveable means associated with the mechanical support that is moveable in response to the weight-shift movements of the suspended pilot and transforming the motions of the moveable means into signals representative of at least one of the pitch, roll, yaw movements of a suspended pilot.

The signals generated by the weight-shift flight control transducer may be used as the pitch and roll input information in an interactive computerized flight simulation system. Furthermore, the signals may also be generated by an actual pilot of a hang glider or ultralight aircraft and used on board to control ailerons, elevators, rudders, or the like, so as to enhance the performance potentials of these types of aircraft.

BRIEF DESCRIPTION OF THE DRAWINGS

Some of the objects having been stated, other objects will appear as the description proceeds, when taken in connection with the accompanying drawings, in which—

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
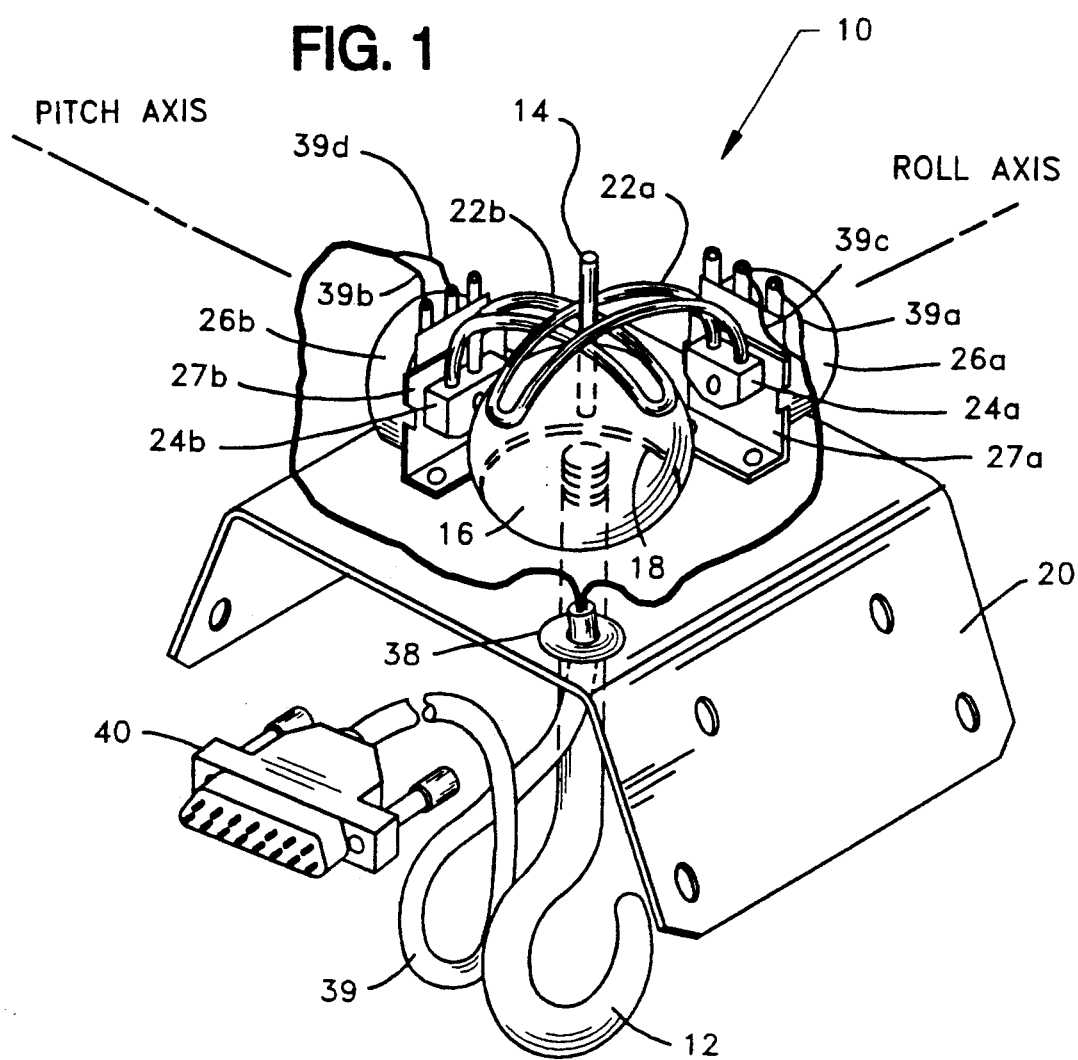
FIG. 1 is a pictorial view of a weight-shift flight control transducer of the present invention which uses potentiometers as the interface between mechanical input and electrical output.

As discussed in detail below, the weight-shift transducer of the present invention may be used in a flight simulation environment (FIG. 5), in an actual hang glider or ultralight aircraft (FIG. 6) to provide input information for control of electromechanical ailerons, elevators, etc., or in an entertainment system based on the suspended pilot environment. A typical embodiment of the weight-shift transducer 10 of the invention is shown in FIG. 1. A suspension bolt 12 from which the pilot is suspended is connected to a vector rod 14 through a 1.375 inch diameter bearing ball 16 (Reid Tool Supply Co., Muskegon, Mich. - Item No. SB-8). The bearing ball forms a ball/socket arrangement by resting in a 1.1875 inch diameter hole 18 in a 0.063 inch thick base plate 20. A liberal amount of general purpose grease is applied to the ball. Arcuate pitch and roll followers 22a and 22b capture vector rod 14 with a minimum amount of clearance. Followers 22a, 22b are linked to the shafts of 100 K$\Omega$ potentiometers 26a and 26b through collar blocks 24a and 24b. These collar blocks are securely attached to the shafts of the potentiometers with no slippage. Potentiometers 26a, 26b are riveted onto a base plate 20 through mounting brackets 27a and 27b in such a manner that the rotational axis of each potentiometer is closely aligned with the center of rotation of bearing ball 16. About 12 feet of four-wire signal cable 39 (Inmac, Norcross, Ga. - Model No. 1804-1) is split and the individual wires 39a, 39b, 39c, 39d are soldered to the potentiometer tabs. A rubber grommet 38 is used at the base plate exit hole to protect the signal cable from damage and also to prevent it from slipping out of position. The end of the signal cable 39 is terminated with a conventional D-type 15-pin male connector 40.

Figure 2:
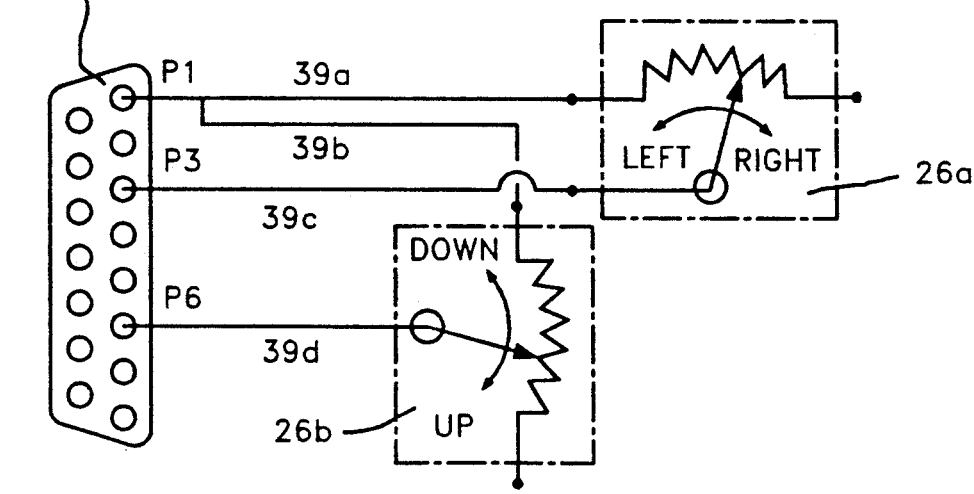
FIG. 2 is an electrical schematic of the transducer depicted in FIG. 1.

FIG. 2 shows the electrical schematic for the transducer of FIG. 1 permitting it to be used to interface with modern personal computer game cards. It will be noted that only two of the three solder tabs on each potentiometer are connected. The pin layout for the standard D-type 15-pin male connector 40 is shown. The connector provides a standard interface for a typical computer game card. Pin P1 is the supply voltage connection for the transducer. Most game cards and computers provide +5 volts DC through this pin. Two wires of the four-wire signal cable are soldered to the pin P1 terminal, while the center wire for the roll potentiometer 26a is soldered to pin P3, and the center wire for the pitch potentiometer 26b is soldered to pin P6.

Figure 3:
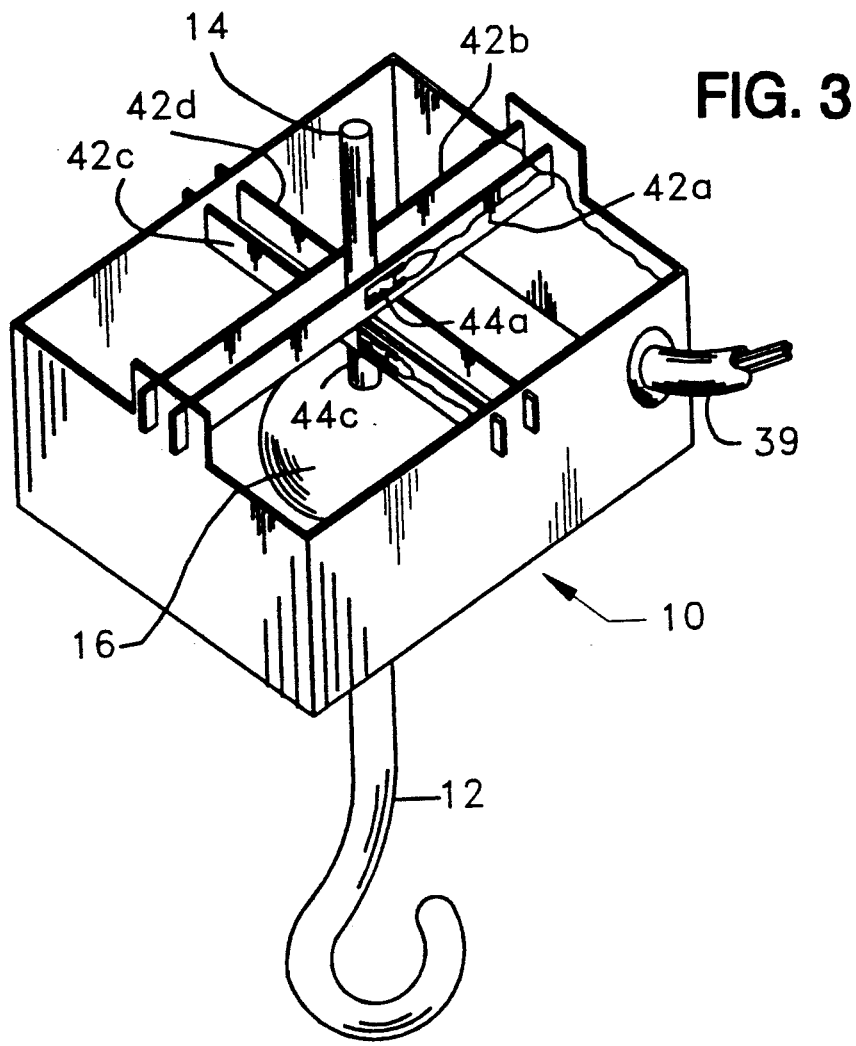
FIG. 3 is pictorial view of an alternative embodiment of the weight-shift transducer which uses strain gauges to convert mechanical movements into electrical signals.
Figure 4:
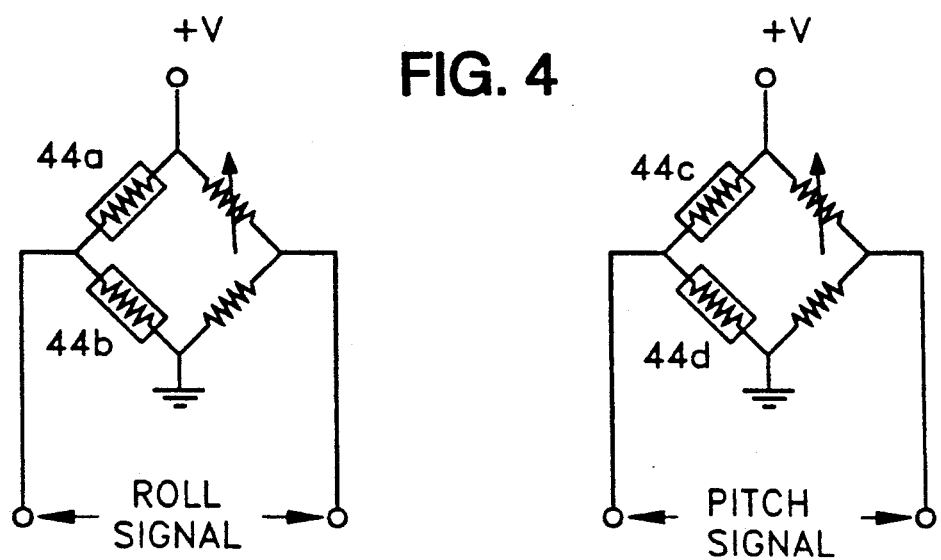
FIG. 4 is an electrical schematic for the strain gauge circuitry.

FIG. 3 shows an alternative embodiment of the weight-shift transducer. This transducer 10' employs strain gauges instead of potentiometers to produce the voltage changes during operation. The vector rod 14 is captured between thin strain strips 42a, 42b, 42c, 42d which have respective strain gauges 44a, 44b, 44c, 44d bonded to them. FIG. 4 shows the circuit diagram for the embodiment of FIG. 3 which employs the strain strips and gauges. Wheatstone bridge circuits are used to provide measurable resistance changes across the signal terminals. Dual gauges for each axis (roll and pitch) have been used to provide temperature compensation for the circuits.

Figure 5:
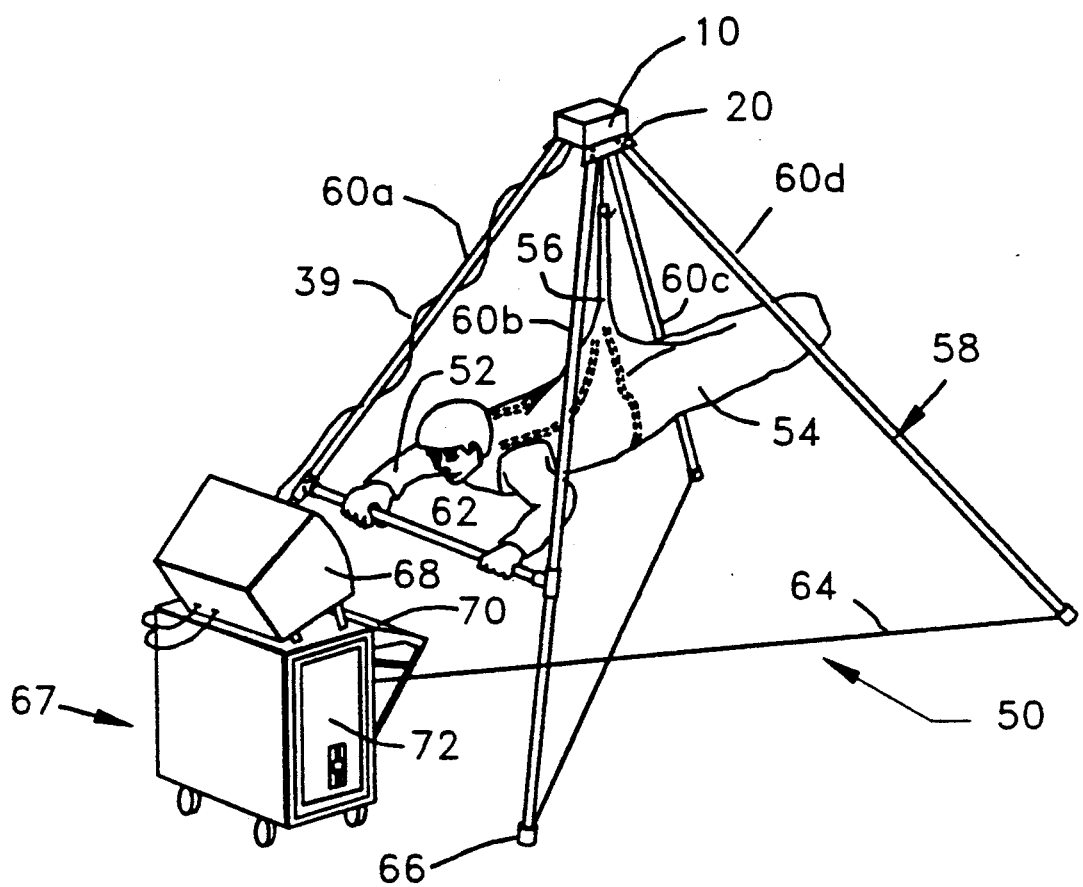
FIG. 5 is a pictorial view of a computer controlled flight simulation system that utilizes the weight-shift transducer of the invention to provide the pitch and roll input information to the computer and associated flight simulation software.

An application of the weight-shift transducer will now be described in connection with a computer controlled flight simulator 50 as illustrated in FIG. 5. A pilot 52 is held by a harness 54 which is suspended by a suspension strap 56 from a mechanical support generally designated by the reference numeral 58. The transducer base plate 20 is mounted to four 8 feet long legs 60a, 60b, 60c, 60d which extend downward and outward to form a quadrapod with a base area of approximately 85 inches by 85 inches. A control bar 62 is connected to the front legs 60a and 60b so that the bar is about 28 inches above floor level. Steel tension cables 64 are run corner to corner at the base of the quadrapod to enhance stability. These wires are placed as close to the floor as possible. It is desirable to protect the floor from damage by using rubber furniture feet 66 at the base of the legs. Holes are drilled in the furniture feet to provide for passage of the tension cables. The ends of the tension cables have swaged aluminum or copper terminals (not shown) attached. These terminals lock the cables into slots which are cut into the very bottom of the legs 60a, 60b, 60c, 60d.

A computer system 67 is placed in front of the pilot in such a manner that the screen of the video monitor 68 is about 27 inches from floor level and tilted back approximately 25 degrees off vertical. Preferably, the keyboard 70 is also within the pilot's reach. The computer 72 is outfitted with a standard game card adapter, such as CH Products' "Gamecard III TM Automatic," which provides a conventional D-type 15-pin female connection port. The D-type 15-pin male adapter on the end of signal cable 39 of the weight-shift transducer connects to the game card port on the computer 72, and all the other necessary connections for the keyboard, video terminal, and computer are standard and well know in the art. A standard operating system environment is utilized for the computer system, such as Microsoft's MS-DOS ®, version 4.0. A standard flight simulation software package is also loaded onto the computer, such as Microsoft's "Flight Simulator ®," version 4.0. Companion software, e.g. Microsoft's "Aircraft & Scenery Designer," version 1.0, is also loaded onto the computer if the user desires to modify existing aircraft parameters or build new flying sites in the manner known in the art. The operation of this computer controlled flight simulator is discussed below.

Figure 6:
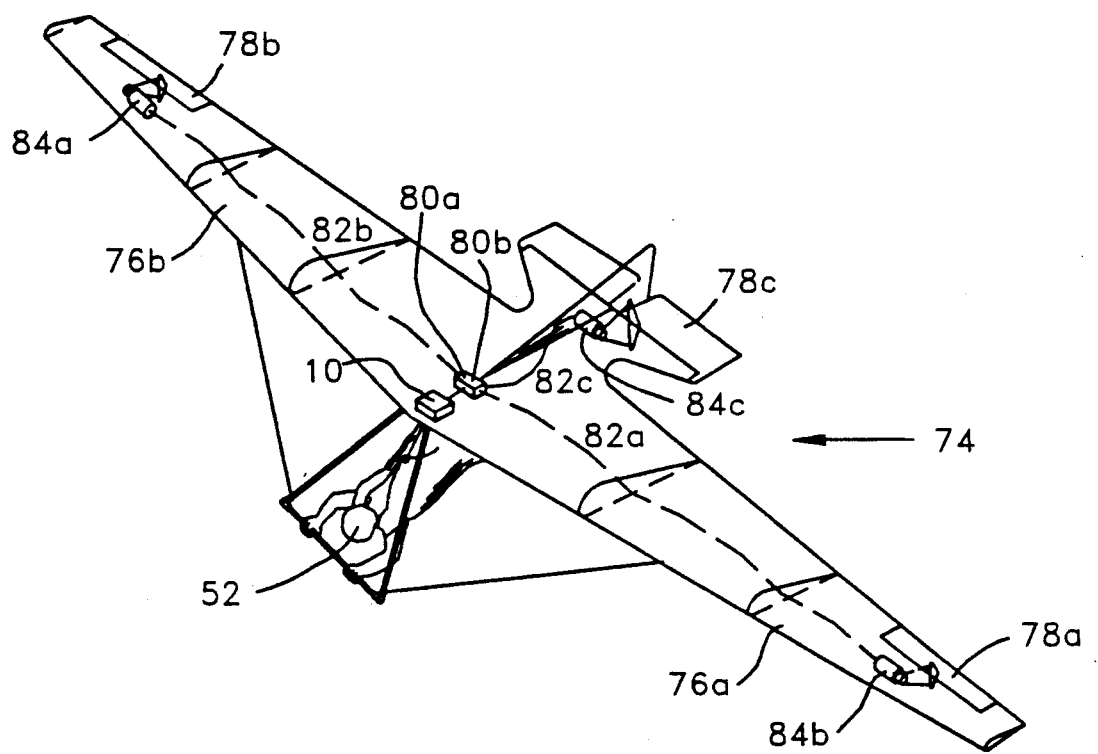
FIG. 6 is a pictorial view of a high performance hang glider that utilizes the weight-shift transducer of the invention to provide pitch and roll information to an on-board processor for controlling remote electromechanical ailerons and elevator.

Another application of the weight-shift transducer will now be described in connection with the aircraft illustrated in FIG. 6. A high performance hang glider 74 with high aspect ratio wings 76a, 76b is outfitted with ailerons 78a and 78b in order to enhance roll response. The pilot 52 is suspended underneath the wing-mounted weight-shift transducer 10 by a strap (not shown) that connects to the transducer's suspension bolt 12. Transducer 10 is electrically connected to on-board processor 80a and power module 80b. The processor and power module are connected through cables 82a and 82b to aileron servos 84a and 84b. The servos are mechanically linked to the hinged ailerons 78a and 78b. Another servo 84c is mechanically linked to an optional elevator 78c. This servo 84c is also connected to the power module and processor through cables 82c. It is recognized that a rudder may also be included in the control system. The rudder movements may be made dependent upon aileron deflection, or the pilot's twisting actions around the yaw axis, or both. It is also recognized that the signal cables may be either electrically conductive wires or fiber optic cables in order to save weight and provide protection against electromagnetic interference and noise. While FIG. 6 shows a central power source and processor, in the alternative, weight may be reduced by providing separate power sources at each servo location, thereby eliminating most of the weight associated with the power cables. Energy is preferably stored in batteries (not shown). The batteries may be of a type that can be charged during flight by lightweight solar panels (not shown) placed on the upper surface of the wings.

Operation

As mentioned above, the suspension bolt 12 of weight-shift transducer 10 is mounted to the bearing ball 16 which allows freedom of rotation in all three axes: pitch, roll, and yaw. As the pilot 52 shifts his weight by pushing and pulling on the control bar 62, the changing load vector on the suspension bolt 12 forces the bearing ball 16 to rotate. This rotation results in the vector rod 14 maintaining alignment with the suspension bolt, causing the followers 22b and 22a to rotate relative to the amount of angular displacement in the pitch and roll planes, respectively. These followers cause the potentiometers 26b and 26a to rotate in equal fashion, since they are linked through the firmly mounted collar blocks 24b and 24a. The linear potentiometers change resistance with changes in rotation. A voltage is supplied across the potentiometers through the signal wires 39a and 39b, with output voltages returned through wires 39c and 39d in relation to the rotation angles of each potentiometer. As described below, these wires are connected to pins of the D-type connector in the conventional manner so that the analog voltage signals can be fed into a game card for a computer while running a flight simulation software program. The final result is that when the pilot pulls his body forward on the control bar, the voltage at pin P6 will increase and the computer program will recognize a pitch down command. Similarly, a pitch up command is recognized when the pilot pushes away from the control bar, forcing the voltage at pin P6 to drop. The roll commands are as similar. When the pilot pushes his body to the right, the voltage at pin P3 will drop and the computer program will recognize a right roll command. A left roll command is recognized when the pilot pushes his body to the left, forcing the voltage at pin P3 to increase. As mentioned above, standard computer software packages are available which utilize the voltage signal data at the game card port in order to recalculate flight parameters and present the flight conditions through the video monitor 68. Audio feedback is also available through a built-in speaker located inside the computer 72.

In the actual flight application illustrated in FIG. 6, transducer 10 transforms the weight-shift movements of the pilot 52 into electrical signals which are fed through cables (not shown) to the processor 80a and to the power module 80b. Power is distributed through cables 82a and 82b to servos 84a and 84b. These servos activate hinged ailerons 78a and 78b which cause the glider to roll about the longitudinal axis. In a similar fashion, the elevator 78c is activated by a servo 84c which receives power through cables 82c from the power module 80b. The effect is that when the pilot leans his body right or left the ailerons roll the glider right or left, respectively. Likewise, when the pilot pulls his body forward or pushes his body rearward, the elevator pitches the glider down or up respectively.

Accordingly, it can be seen that the weight-shift flight control transducer of the present invention can be used to transform the weight-shift movements of a suspended pilot into electrical signals. These electrical signals can be incorporated into the flight control system of a hang glider or ultralight aircraft in order to enhance the performance and handling qualities. Also, the transducer can be incorporated into a computerized flight simulation system which enables the user to experience the effects of weight-shift flight control.

Although the descriptions above contain many specificities, these should not be construed as limiting the scope of the invention but as merely providing illustrations of some of the presently preferred embodiments of this invention. For example, the active components of the weight-shift transducer can be any of a number of devices, such as piezoresistive or piezoelectric elements, load cells, strain gauges, differential transformers, hall effect devices, proximity sensors, pressure sensors, etc.; the transducer can be built so as to contain no moving parts, only parts which strain or deflect enough to provide measurable changes in strain, pressure or deflection. The transducer as used for flight simulation input is not limited to personal computers and currently available software. The transducer as used in actual flight control systems need not be limited to the system shown here. The control surfaces may include spoilers, drag devices, rudders, wing warping mechanisms, etc. Furthermore, a system incorporating the principles of the invention may be built purely for entertainment wherein the player pretends to fly his weight-shift machine through adventurous and challenging environments. Instead of looking at a fixed screen or monitor in front of his face, the player can be wearing a helmet which displays visual images in relation to the position of his head, neck, and body.

Thus the scope of the invention should be determined by the appended claims and their legal equivalents, rather than by the examples given.

That which is claimed is:

1. In a suspended-pilot environment that includes a mechanical support structure for suspending a pilot so that the pilot is provided with freedom of weight-shift movement of the type used to control a hang glider or ultralight aircraft, a weight-shift flight control transducer associated with said mechanical support structure including means for transforming the weight-shift movements of the suspended pilot into electrical signals representative of the weight-shift movements.

2. A weight-shift flight control transducer as claimed in claim 1 wherein the suspended pilot environment is an actual aircraft including moveable flight control surfaces and means for moving said flight control surfaces in response to the signals generated by said weight-shift flight control transducer.

3. A weight-shift flight control transducer as claimed in claim wherein said suspended pilot environment is a computerized flight simulation system including a computer, flight simulation software and a video monitor positioned in view of the suspended pilot, and said computerized flight simulation system is operable in response to the signals generated by the weight-shift flight control transducer.

4. A weight-shift flight control transducer as claimed in claim 1 including means defining a suspended pilot load vector and the axes of a controlled reference system and means for generating electrical signals indicative of the angles formed between the suspended pilot's load vector and the axes of the controlled reference system.

5. A weight-shift flight control transducer as claimed in claim 4 including a ball and socket arrangement with the ball thereof having three dimensional rotational freedom of movement.

6. A weight-shift flight control transducer as claimed in claim 5 including means fixedly connecting said ball to the suspended pilot along a line co-linear with the pilot's load vector.

7. A weight-shift flight control transducer as claimed in claim 6 including ball followers and associated potentiometers for following the movements of said ball in at least two axes and generating electrical signals indicative of said movements.

8. A weight-shift flight control transducer as claimed in claim 6 including strain gauges and associated strain strips connected for movement with said ball.

9. A computer system for permitting a trainee in the art of suspended pilot aircraft flight to suspend himself in a suspended pilot harness in a controlled training environment and interact with a computerized flight simulation system so that his actual weight-shift movements cause the computer to recalculate flight parameters and continuously present flight conditions simulating those that would be produced in an actual flight by a pilot's weight-shift movements, said system comprising:
 a mechanical support for suspending the trainee in a harness with the trainee having freedom of weight-shift movement of the type used to control a hang glider or ultralight aircraft;
 a weight-shift flight control transducer associated with said mechanical support for generating electrical signals representative of the weight-shift movements of the trainee; and
 a computer system comprising a computer, a video monitor positioned in sight of a suspended pilot trainee and flight simulation software loaded into the computer, said computer system permitting input of the signals representative of the weight-shift movements of the trainee and generating a video image of flight conditions that is continuously recalculated by the computer.

10. A system as claimed in claim 9 wherein said weight-shift flight control transducer includes means defining a suspended pilot load vector and the axes of a fixed controlled reference system and means for generating electrical signals indicative of the angles formed between the suspended pilot's load vector and the axes of the controlled reference system.

11. An aircraft flown by a suspended pilot comprising:
 wings;
 a harness for a suspended pilot;
 a mechanical support associated with said wings for suspending said harness and providing the suspended pilot with freedom of weight-shift movement of the type used to control the aircraft;
 a weight-shift transducer associated with said mechanical support for generating electrical signals representative of the movements of the suspended pilot;
 at least one electromechanical moveable control surface on the aircraft; and
 processor control means for receiving the signals from said weight control transducer and controlling the motion of said control surface in response thereto.

12. An aircraft as claimed in claim 11 wherein said aircraft is a hang glider, said weight-shift control transducer produces signals representative of the pitch and roll weight-shift movements of the pilot and the control surfaces that are moveable in response to the signals comprise ailerons and an elevator.

13. An aircraft as claimed in claim 11 wherein said weight-shift flight control transducer includes means defining a suspended pilot load vector and the axes of a controlled reference system and means for generating electrical signals indicative of the angles formed between the suspended pilot's load vector and the axes of the controlled reference system.

14. A method of tracking the weight-shift movement of a suspended pilot in an interactive computerized flight simulation system or an actual aircraft such as a hang glider or ultralight aircraft and generating signals representative of the suspended pilot's weight-shift movements in at least one of the pitch, roll, yaw axes, said method comprising:
 suspending a pilot from a mechanical support structure so as to provide the pilot with a freedom of weight-shift movements of the type used to control a hang glider or ultralight aircraft;
 providing moveable means associated with the mechanical support that is moveable in response to the weight-shift movements of the suspended pilot; and
 transforming the motion of the moveable means into electrical signals representative of at least one of the pitch, roll, yaw movements of the suspended pilot.

15. The method of claim 14 including the step of feeding the signals to the computer of an interactive computerized flight simulation system.

16. The method of claim 15 including the steps of providing a control bar forward of the pilot for engagement by his hands, permitting the suspended pilot to create pitch signals by pushing away from and pulling toward the control bar and roll signals by pushing his body to the right and left and feeding roll and pitch signals to the interactive computer flight simulation system.

17. The method of claim 16 including the step of programming the interactive computer flight simulation system to recalculate flight parameters and continuously present flight conditions on a video monitor simulating those that would be produced in actual flight by a pilot's weight-shift movements.

18. The method of claim 14 wherein the suspended pilot is mechanically supported from the wing structure of an actual aircraft such as a hang glider or ultralight aircraft, and including the step of feeding the signals to an on-board processor and, through said signals, controlling the motion of at least one moveable electromechanical control surface of the aircraft.

19. The method of claim 18 including the step of providing a control bar forward of the pilot for engagement by his hands, permitting the suspended pilot to create pitch signals by pushing away from and pulling toward the control bar and roll signals by pushing his body to the right and left, and feeding roll and pitch signals to the on-board processor.

* * * * *